US008690040B2

(12) United States Patent
Sharrow

(10) Patent No.: US 8,690,040 B2
(45) Date of Patent: Apr. 8, 2014

(54) METHOD OF FORMING A SOLDER JOINT

(71) Applicant: Keith Sharrow, Mission Viejo, CA (US)

(72) Inventor: Keith Sharrow, Mission Viejo, CA (US)

(*) Notice: Subject to any disclaimer, the term of this patent is extended or adjusted under 35 U.S.C. 154(b) by 0 days.

(21) Appl. No.: 13/918,380

(22) Filed: Jun. 14, 2013

(65) Prior Publication Data

US 2013/0306713 A1 Nov. 21, 2013

Related U.S. Application Data

(62) Division of application No. 13/474,392, filed on May 17, 2012.

(51) Int. Cl.
B23K 5/00 (2006.01)
B23K 5/02 (2006.01)
B23K 5/22 (2006.01)
B23K 37/02 (2006.01)
B23K 3/00 (2006.01)
B23K 3/08 (2006.01)
F16P 1/06 (2006.01)
B23K 37/053 (2006.01)

(52) U.S. Cl.
CPC ... *B23K 5/00* (2013.01); *B23K 5/22* (2013.01); *B23K 37/02* (2013.01); *B23K 37/053* (2013.01); *B23K 3/00* (2013.01); *B23K 3/08* (2013.01); *B23K 5/003* (2013.01); *B23K 3/087* (2013.01); *B23K 5/006* (2013.01); *F16P 1/06* (2013.01)
USPC ...... 228/59; 219/85.16; 219/85.1; 219/85.22; 219/136; 219/137.43

(58) Field of Classification Search
CPC .............. B23K 5/00; B23K 5/02; B23K 5/22; B23K 5/003; B23K 5/006; B23K 37/02; B23K 37/053; B23K 3/00; B23K 3/08; B23K 3/087; F16P 1/06
USPC ............. 228/59; 219/85.16, 85.1, 85.22, 136, 219/137.43
See application file for complete search history.

(56) References Cited

U.S. PATENT DOCUMENTS 6,561,409 B1 * 5/2003 Spirig .............................. 228/59
2007/0284413 A1 * 12/2007 Franklin ........................ 228/101

* cited by examiner

*Primary Examiner* — Erin Saad
(74) *Attorney, Agent, or Firm* — John D. Titus

(57) ABSTRACT

A method of forming a solder joint includes the steps of providing a heat shield member formed as an arcuate preferably metallic shell attached to a spring-clamp by means of an obedient shaft; attaching the spring clamp to a structure adjacent the solder joint; moving the heat shield member by bending the obedient shaft so that the heat shield member is positioned in a location spaced-apart from the solder joint with the concave surface of the heat shield member facing the solder joint; and applying heat from a torch to the solder joint from the side opposite the heat shield so that the heat shield reflects the heat back onto the solder joint.

10 Claims, 5 Drawing Sheets

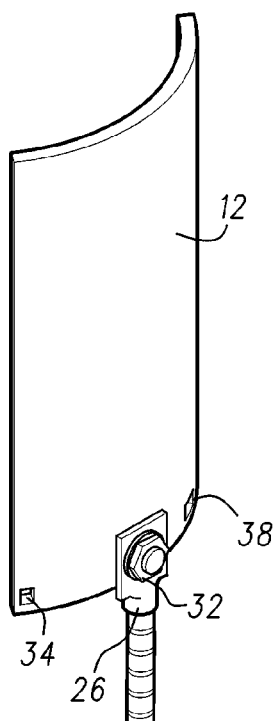
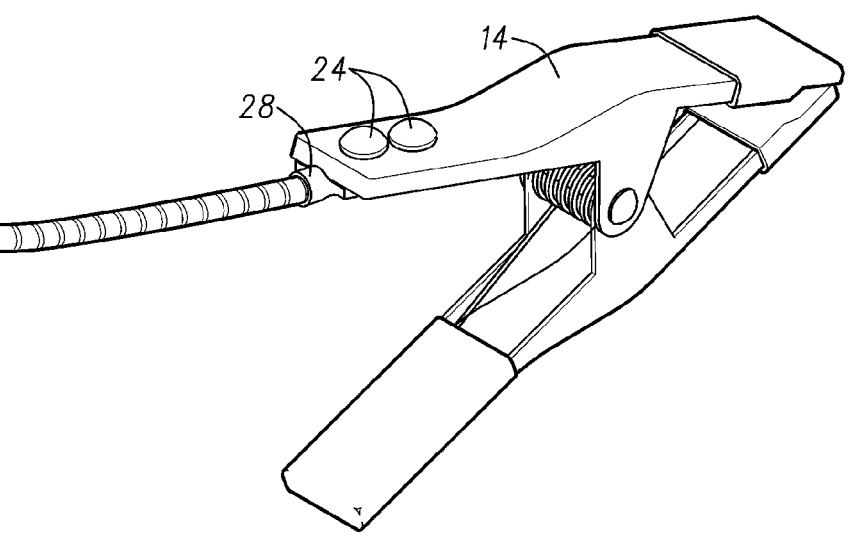
Fig. 2

METHOD OF FORMING A SOLDER JOINT

CLAIM OF PRIORITY

This is application claims priority of pending U.S. patent application Ser. No. 13/474,392 filed on May 17, 2012, which claims priority of U.S. Provisional Patent Application 61/490,044 filed on May 25, 2011.

BACKGROUND OF THE INVENTION

This invention relates generally to hand tools, and in particular to hand tools for use by plumbers.

In the plumbing trade, it is common to sweat together joints in copper pipe and other metal plumbing fittings using an open-flame torch together with an appropriate solder or brazing alloy. Often, especially when plumbing repairs are being performed, as opposed to new construction, the joint being assembled is in close proximity to wall studs, insulation, drywall, electrical wiring, or other building materials that may be damaged by the open-flame torch. Accordingly, it is desirable to have some means of protecting the materials adjacent the joint being assembled.

Flexible mats formed of a heat resistant fiberglass material are commonly employed to protect the area around the solder joint, but these mats are often difficult to place, especially when working overhead as the mat tends to drop onto the joint itself. The fiberglass mats also wear out quickly, requiring frequent replacement. Heat resistant gels are also commonly used to prevent heat damage to protect the area surrounding the joint during soldering. Heat resistant gels, however, are expensive and cannot be applied to extremely porous surfaces such as cellulose insulation. It is known in the art to form crude heat shields from soft drink cans, however, these heat shields are difficult to position properly. Accordingly, what is needed is a reusable, durable heat shield device that can be easily positioned to protect the area surrounding the joint during soldering regardless of the orientation of the joint and the surrounding building materials.

SUMMARY OF THE INVENTION

The present invention comprises a reusable, durable heat shield for use in protecting the area surrounding a solder joint during the soldering process and method of using the heat shield. In the illustrative embodiment of the invention, the heat shield comprises an arcuate metallic shell attached to a spring-clamp by means of an obedient shaft which enables the heat shield to be moved to any position relative to the spring-clamp so that the shield can be placed behind the joint being soldered. The arcuate shell is preferably formed from a material having a high infrared reflectivity and low affinity for tin-lead and lead-free soldering alloys. The obedient shaft is preferably formed from helically-wound steel spring outer sheath surrounding a ductile copper wire core. The spring steel outer sheath prevents the ductile copper wire core from being bent at too sharp of a radius (which would cause the ductile core to work-harden and fracture) while at the same time protecting the ductile copper wire core from the open-flame torch.

BRIEF DESCRIPTION OF THE DRAWING

The present invention will be better understood from a reading of the following detailed description, taken in conjunction with the accompanying drawing figures in which like references designate like elements and, in which:

FIG. 2 is a front perspective view of the plumber's heat shield of FIG. 1;

DETAILED DESCRIPTION

Figure 1:
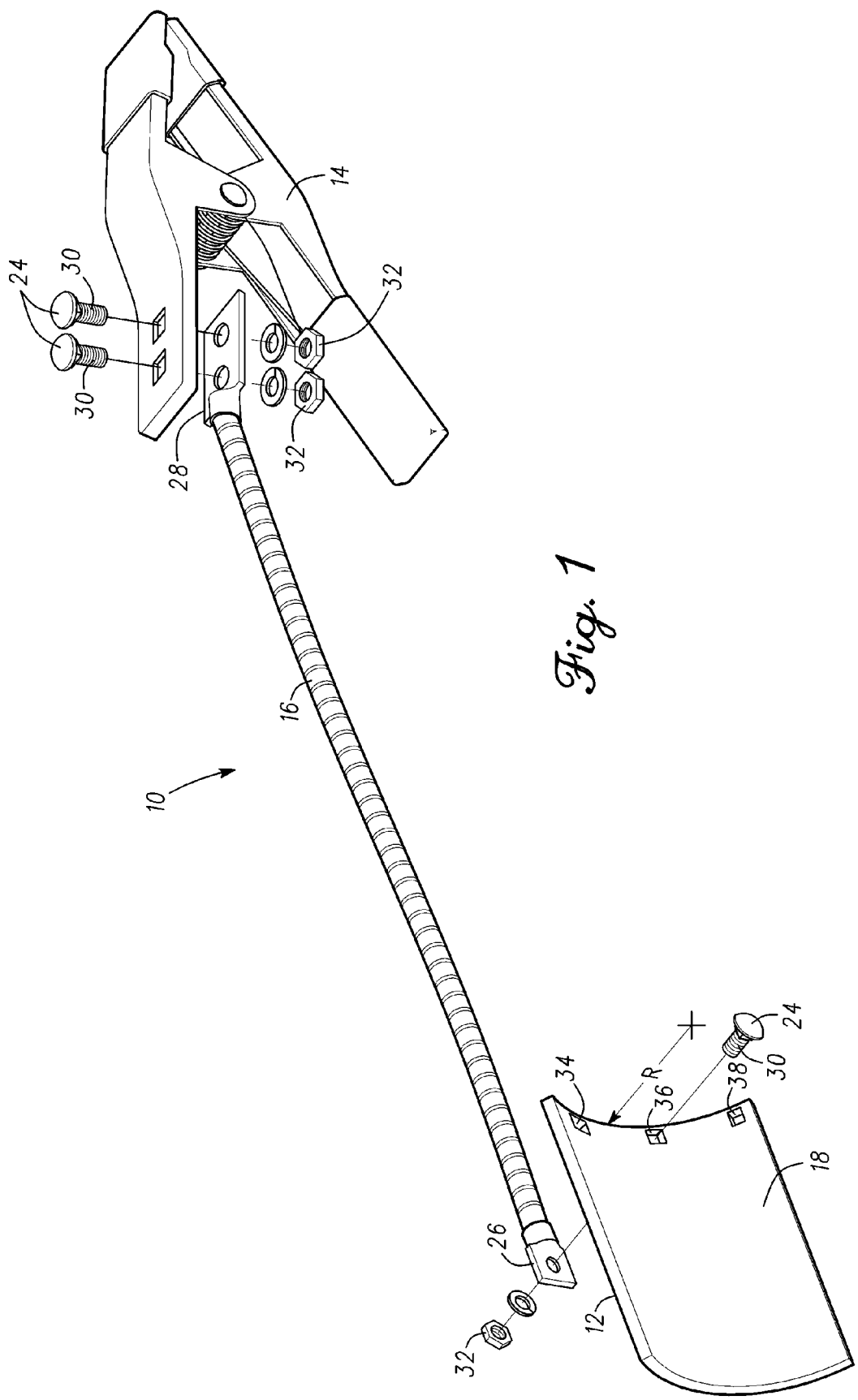
FIG. 1 is an exploded, perspective view of a plumber's heat shield incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 3:
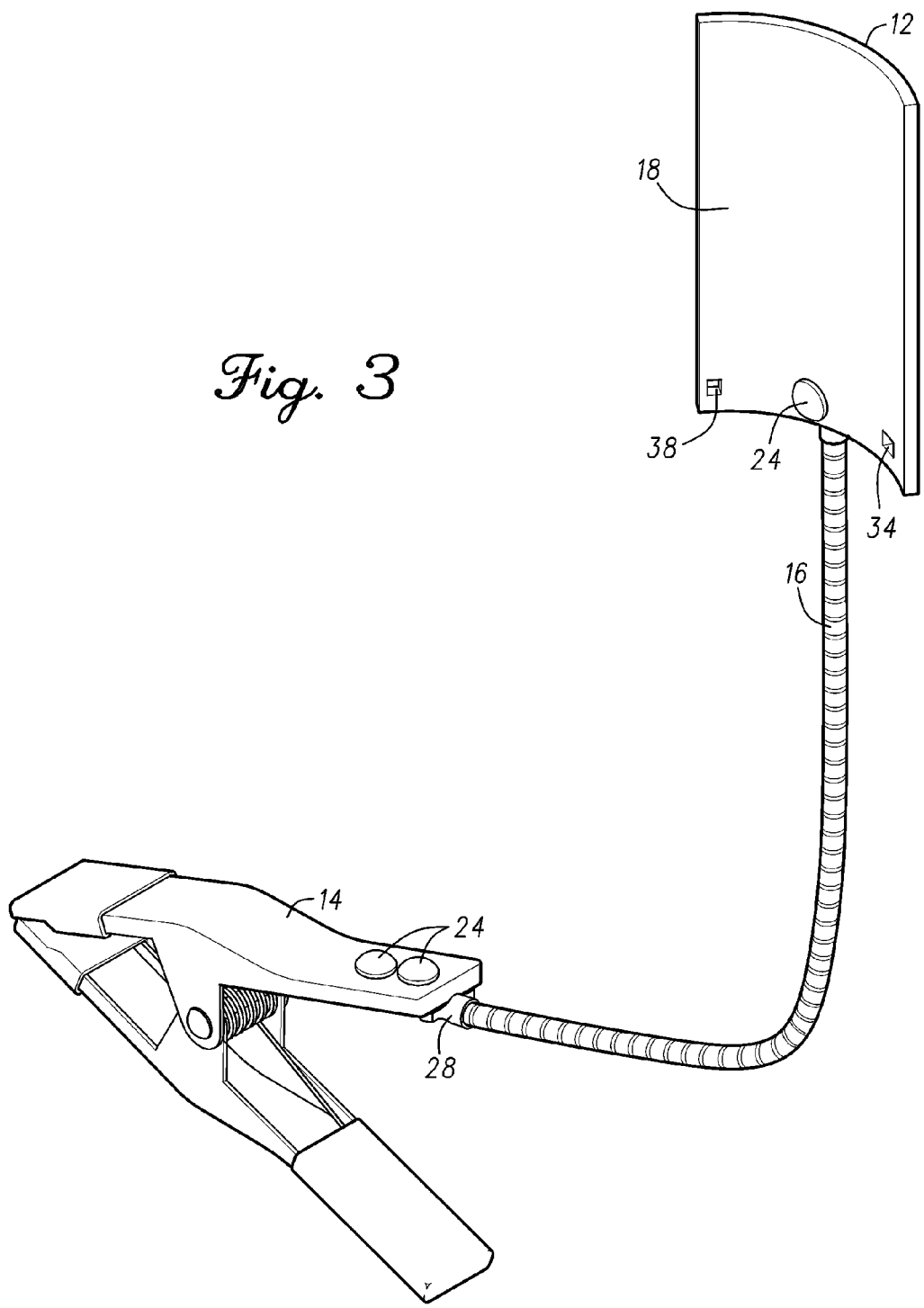
FIG. 3 is a rear perspective view of the plumber's heat shield of FIG. 1.

With reference to FIGS. 1-3, plumber's heat shield 10 comprises an arcuate shell 12 which is attached to a spring clamp 14 by means of obedient shaft 16. Arcuate shell 12 preferably comprises a cylindrical sector approximately 4 inches long, having a radius of curvature "R" of from 1 to 4 inches and preferably about 2 inches and an included angle of between 30 degrees and 180 degrees, preferably about 90 degrees (¼ circle).

Arcuate shell 12 is preferably formed of a metallic material having a low affinity for conventional tin-lead solder and lead-free solders, which consist typically of tin, copper, bismuth, and silver. At the same time arcuate shell 12 has a high reflectivity in the infrared range of the electromagnetic spectrum. Steel has low affinity for solder, but has poor infrared reflectivity. As used herein, a surface has high infrared reflectivity if its reflectivity is better than 70% in the infrared range of the electromagnetic spectrum. Silver, gold and copper all have good (high) reflectivity in the infrared range of the electromagnetic spectrum (better than 90% if polished to mirror finish), however, all have high affinity for tin-lead and lead-free solders. Consequently, any solder that splattered onto the heat shield from the joint being assembled would be difficult to remove. Silver and gold are also too expensive to be of practical use. Aluminum that is polished to a mirror finish has the highest reflectance of any metal in the 3,000-10,000 nm (far IR) regions and is significantly less expensive than silver, gold or copper. Aluminum also has significantly lower thermal capacity and therefore cools faster if accidentally heated. Accordingly, in the illustrative embodiment arcuate shell 12 is made from ⅛ inch thick aluminum with the concave surface 18 being polished to a high gloss (63 micro-inches Ra or smoother) or, preferably polished to a mirror finish (8 micro-inches Ra or smoother). Nonmetallic shells, such as thermoset plastics and high temperature thermoplastics, may also be used, provided the concave surface is coated with a high gloss or mirror finished aluminum metallization.

Figure 6:
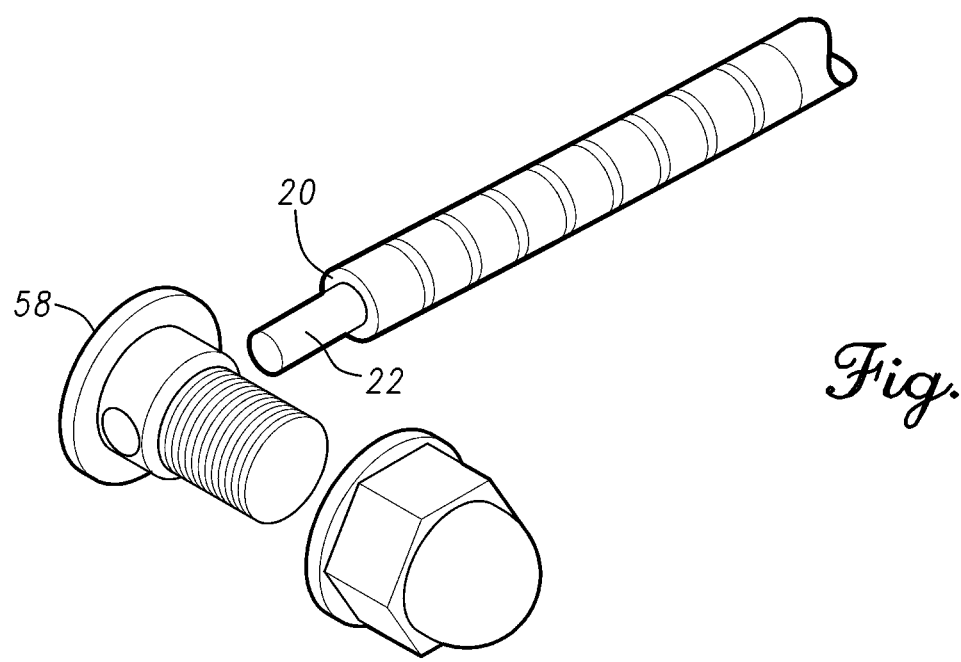
FIG. 6 is a perspective view of another alternative embodiment of an end fitting for attaching the obedient shaft to the heat shield.

Obedient shaft 16 comprises a helically wound steel spring outer sheath 20 having an outer diameter of less than about ⅜ of an inch, preferably about ¼ inch O.D. Preferably outer sheath 20 is between 12-24 inches long, preferably about 18 inches long and is wound from conventional steel spring wire having a wire diameter of 0.04-0.08 inch in diameter. The coils of outer sheath 20 are preferably close-packed so that outer sheath can bend or elongate, but cannot be compressed. Obedient shaft 16 further comprises a ductile core 22 (FIG. 6), disposed inside outer sheath 20. Ductile core 22 can be formed of any malleable material such as steel or aluminum wire but in the illustrative embodiment comprises solid 12-gauge soft (annealed) copper wire which is just small enough in diameter to be slid inside outer sheath 20 (e.g. with a diametral clearance of 0.009 to 0.089 inch). Using copper for ductile core 22 has the advantage over steel or aluminum in that it has a lower modulus of elasticity and therefore is more malleable and, although copper does work harden if bent repeatedly, copper can be annealed simply by heating. Obedient shaft 16 is capable of supporting a load of at least 1 ounce cantilevered 18 inches horizontally outward along the obedient shaft without moving.

It is important that obedient shaft 16 be made from a metallic outer sheath 20 with a ductile core 22 rather than with conventional gooseneck tubing. Although gooseneck tubing is flexible, what the inventor of the present invention discovered was that conventional gooseneck tubing, which relies on interference between the helical windings of each adjacent layer to give the gooseneck tubing its obedience, quickly lost its elastic strength if the flame from the open-flame torch came in contact with the gooseneck tubing. Use of a helically wound steel spring outer sheath in combination with a ductile copper wire core enables the obedient shaft of the present invention to resist damage from the open-flame torch.

Obedient shaft 16 is attached to a shell 12 and spring clamp 14 by means of fasteners 24 which are assembled through lugs 26 and 28 swaged onto the ends of obedient shaft 16. In the illustrative embodiment of FIG. 1, fasteners 24 comprise threaded carriage bolts 30 with corresponding nuts 32, however, any suitable fastener such as rivets, screws, or adhesives may be used without departing from the scope of the invention. The fasteners 24 are assembled through one of a plurality of apertures 34, 36, 38 formed along the lower edge 37 of shell 12. Apertures 34, 36, 38 permit the shell 12 to be positioned in different locations depending on the needs of the user. Apertures 34, 36, 38 are non-circular (preferably square) and are sized to accommodate fasteners 24 so as to provide an anti-rotation feature for maintaining the heat shield in a fixed orientation. Alternatively, a lug similar to lug 28 may be utilized at shell 12 to provide anti-rotation. Shell 12 is free of windows made of transparent or semi-transparent materials as are found in welding helmets and the like, and is free of holes or other apertures other than apertures 34, 36 and 38 located along edge 37.

Spring-clamp 14 preferably comprises a commercially-available spring clamp such as Irwin Tools model 222702 having a jaw opening of approximately 2 inches and a handle length of approximately 6 inches. This enables spring-clamp 14 to firmly clamp the edge of standard nominal 2-inch wall studs and floor joists (e.g. 2×4's, 2×6's, 2×8's etc. which have an actual width of approximately 1½ inch). Obedient shaft 16 is attached so that it extends from the handle portion of spring clamp 14, although other attachment locations such as the pivot of clamp 14 are within the scope of the invention.

Figure 4:
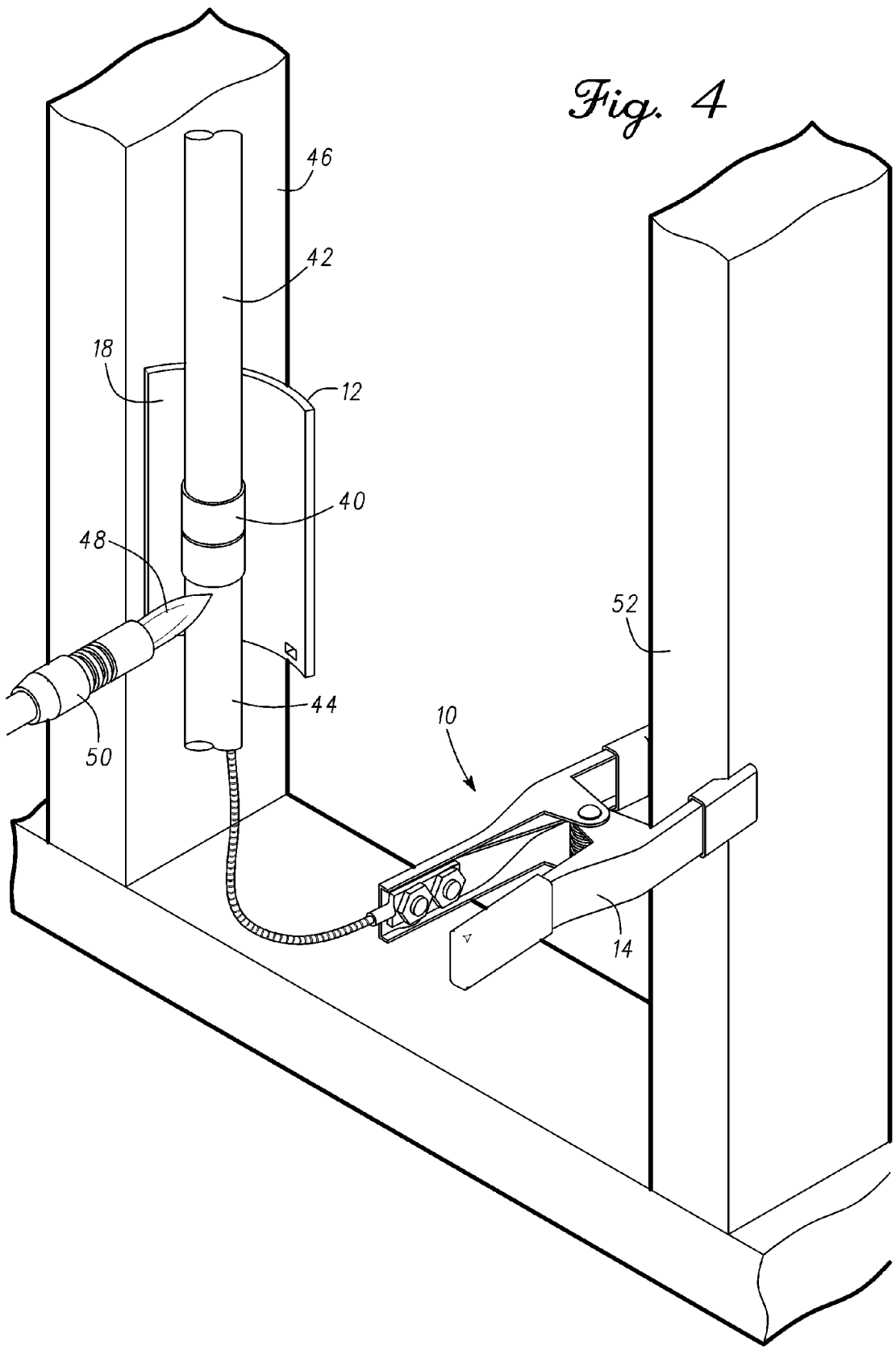
FIG. 4 is a perspective view of the plumber's heat shield of FIG. 1 in position to protect the area surrounding a solder joint during the soldering operation.

As shown in FIG. 4, a solder joint 40, which is made between two pieces of pipe 42 and 44 is frequently in close proximity to a wall stud 46. Therefore, it is desirable to protect wall stud 46 from the flame 48 of torch 50. This is accomplished using plumber's heat shield 10 by clamping spring-clamp 14 to an adjacent wall stud 52. Arcuate shell 12 is then positioned by bending obedient shaft 16 as necessary so that the concave surface 18 is located behind the solder joint 40 and facing substantially toward flame 48. Flame 48 is then applied to the front side 49 to heat the joint to a sufficient temperature for the solder to flow into the joint. Arcuate shell 12 protects wall stud 46 from the heat of flame 48 by reflecting the infrared energy back toward the joint 40. Accordingly, not only does arcuate shell 12 protect wall stud 46, but because the infrared energy is reflected back toward joint 40, joint 40 is heated more quickly than would occur if arcuate shell 12 were not present.

The polished surface 18 of arcuate shell 12 also reflects visible light, so that shield 10 doubles as an inspection mirror to enable the plumber, working from the front side 49 of the joint, to see the reverse side 51 of the joint being assembled. Thus, not only does the present invention comprise a reusable, durable heat shield, it also saves energy that would otherwise be wasted heating the fiberglass or gel heat absorbing compounds of the prior art, and it performs the function of the inspection mirror that the user would otherwise have to purchase separately.

Figure 5:
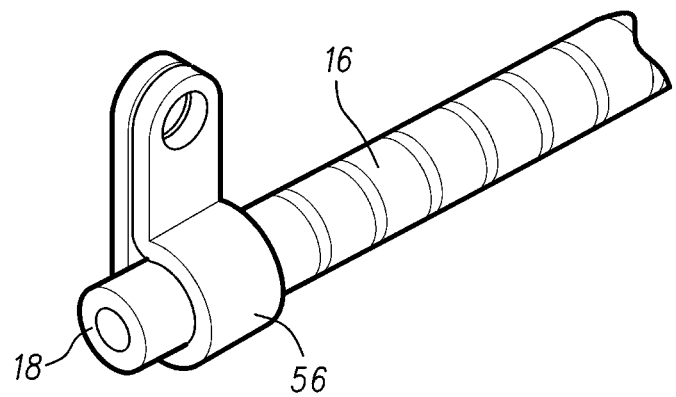
FIG. 5 is a perspective view of an alternative embodiment of an end fitting for attaching the obedient shaft to the heat shield.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment of FIGS. 1-4 obedient shaft 16 is attached by means of lugs 26 and 28, other methods of attachment such as cable strap 56 (FIG. 5) or pinch bolt 58 (FIG. 6) or any other means of attachment are considered within the scope of the invention. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "substantially" or "generally" when used with mathematical concepts or measurements mean within ±10 degrees of angle or within 10 percent of the measurement, whichever is greater.

What is claimed is:

1. A method of forming a solder joint in a pipe connection comprising:
   providing a heat shield, the heat shield comprising
      a) a clamp having a resiliently-biased jaw
      b) a heat shield member comprising an arcuate shell formed from a material having high infrared reflectivity and low affinity for tin-lead and lead-free soldering alloys, the heat shield member having a concave surface, the concave surface having a radius of curvature of at least 1 inch, and
      c) an obedient shaft, said obedient shaft comprising an elongate member having a longitudinal axis, a proximal end and a distal end, the proximal end of said obedient shaft including a first termination rigidly attached to the clamp, the distal end of said obedient shaft including a second termination rigidly attached to said heat shield member;
   clamping the clamp to a structure adjacent the pipe connection;
   moving the heat shield member by bending the obedient shaft so that the heat shield member is positioned in a location spaced-apart from the pipe connection with the concave surface of the heat shield member facing the pipe connection; and forming the solder joint by applying heat from a torch to the pipe connection from a side of the pipe connection substantially opposite the heat shield.

2. The method of claim 1, wherein:

the step of applying heat from a torch is performed by an operator also located on the side of the pipe connection opposite the heat shield, whereby the pipe connection is disposed between the heat shield and the operator.

3. The method of claim 1, wherein:

the step of moving the heat shield member is performed by an operator so that a reflected image of the pipe connection is directly visible to the operator's eyes.

4. The method of claim 1, wherein:

the clamp has a resiliently-biased jaw capable of clamping the edge of a nominal 2-inch wall stud.

5. The method of claim 4, wherein:

heat shield member is free of windows made of a solid transparent or semi-transparent material.

6. The method of claim 5, wherein:

the concave surface of the arcuate shell has a surface finish of at least 63 micro-inches Ra or smoother.

7. The method of claim 6, wherein:

the obedient shaft comprising a flexible outer sheath surrounding an elongate ductile core.

8. The method of claim 7, wherein:

the elongate ductile core comprises a solid rod formed of annealed copper having an outer diameter that engages the inner diameter of the flexible outer sheath with sufficient clearance to allow the solid copper rod to slide within the inner diameter of the flexible outer sheath.

9. The method of claim 8, wherein the elongate ductile core has an outer diameter that is at least 0.009 inch less than the inner diameter of the flexible outer sheath.

10. A method of forming a solder joint in a pipe connection comprising:

provididing a heat shield, the heat shield comprising
 a) a clamp having a resiliently-biased jaw capable of clamping the edge of a nominal 2-inch wall stud,
 b) a heat shield member comprising an arcuate shell formed from a material having high infrared reflectivity and low affinity for tin-lead and lead-free soldering alloys, the heat shield member having a concave surface, the concave surface having a radius of curvature of at least 1 inch and having a surface finish of at least 63 micro-inches Ra or smoother, and
 c) an obedient shaft, said obedient shaft comprising an elongate member comprising a flexible outer sheath surrounding an elongate ductile core, the elongate ductile core formed from a single strand of solid annealed copper wire inserted into the flexible outer sheath, the obedient shaft having a longitudinal axis, a proximal end and a distal end, the proximal end of said obedient shaft including a first termination rigidly attached to the clamp, the distal end of said obedient shaft including a second termination rigidly attached to said heat shield member;

clamping the clamp to a structure adjacent the pipe connection;

moving the heat shield member by bending the obedient shaft so that the heat shield member is positioned in a location spaced-apart from the pipe connection with the concave surface of the heat shield member facing the pipe connection; and forming the solder joint by applying heat from a torch to the pipe connection from a side of the pipe connection substantially opposite the heat shield.

* * * * *